United States Patent Office 3,017,320
Patented Jan. 16, 1962

3,017,320
1,2-DI(TERT-ALKYL MERCAPTO) ETHANE INSECTICIDES
Richard D. Franz and Paul F. Warner, Phillips, Tex., assignors to Phillips Petroleum Company, a corporation of Delaware
No Drawing. Filed July 13, 1959, Ser. No. 826,458
14 Claims. (Cl. 167—22)

This invention relates to killing insects such as grasshoppers, roaches, flies, ants, gnats, mosquitoes, and the like. In one of its aspects, this invention relates to killing such an insect by contacting the same with a 1,2-di(tert-alkyl mercapto) ethane, the total carbon atoms in the tert-alkyls being not in excess of 24. In another of its aspects, this invention relates to novel insecticidal preparations containing as an essential active ingredient 1,2-di(tert-alkyl mercapto) ethane. In accordance with a specific aspect, this invention relates to a novel insecticidal preparation effective for killing grasshoppers and roaches containing as an essential active ingredient 1,2-di(tert-octyl mercapto) ethane.

The problem of finding insecticides which are truly effective and to which the insects are not resistant is very real. Considerable research and expense are currently involved to discover and to set forth novel and effective insecticides. Predictability in the insecticide field is difficult in almost any case and, indeed, attempts to predict meet with little or no success. Thus, until a truly representative member or members of a specific class of compounds has been tested, one skilled in the art cannot say whether there will be insecticidal activity and if so, whether an acceptable insecticide has been found. We have now found that certain specific compounds, as described herein, are exceptionally active insecticides.

Therefore, an object of this invention is to provide a novel method of kiling insects. In accordance with another object of this invention, novel insecticidal ingredients are provided. In accordance with still another object this invention relates to novel insecticidal preparations especially effective for killing grasshoppers and roaches.

Other aspects, objects, and the seevral advantages of this invention are apparent from a study of this disclosure and the appended claims.

According to the present invention there are provided a method and composition for killing insects, especially grasshoppers and roaches, which comprises applying to said insects an ethane dithio-tert-alkyl ether or 1,2-di(tert-alkyl mercapto) ethane compound having the structural formula

R—S—CH$_2$—CH$_2$—S—R wherein R is a tert-alkyl group ħåving from 4 to 12 carbon atoms. The tert-alkyl substituents need not necessarily be the same. 1,2-di(tert-alkyl mercapto) ethane compounds included in the amove structural formula are, among others, Tert-buyl
Tert-hexyl
Tert-octyl
Tert-decyl
Tert-dodecyl and the like.

Insecticides of this invention can be advantageously prepared by any suitable method known in the art. One particularly desirable method for preparing the 1,2-di-(tert-alkyl mercapto) ethane of this invention comprises reacting a tert-alkyl mercaptan with sodium hydroxide to form an alkali metal tert-alkyl mercaptide. The metal alkali tert-alkyl mercaptide can then be reacted with ethylene dichloride, for example, to form the 1,2-di(tert-alkyl mercapto) ethane. The desired product can be recovered from the reaction mixture by any well known method. The reaction product can be subjected to any well-known separation so as to obtain a substantially pure product as the insecticide or the reaction product can be steam distilled to remove unreacted materials, dried and then utilized as the insecticidal ingredient.

Insecticides of the present invention can be advantageously used in any of the forms in which insecticides are commonly employed, such as solutions, emulsions, aerosols, wettable powders, and the like. Well known dispersing agents can be used when preparing emulsions with water or other immiscible liquids and the resulting compositions employed as sprays. One convenient method for the preparation of aqueous suspensions is to dissolve the insecticide in a solvent immiscible with water, such as xylene, add a surface active agent, and finally water. When applying the insecticides in the form of aerosols, they can be dissolved in such solvents as acetone, cyclohexanone and the like. These solutions are then employed in an aerosol bomb in conjunction with a repellent such as a halogenated hydrocarbon and other similar non-hazardous, compressible, normally gaseous materials.

When applying the insecticides of this invention in a solvent or adjuvant carrier medium, the lower effective limit of the insecticide ingredient concentration is about 0.1 weight percent. Generally, it is advantageous to make application of the insecticide in a manner so as to deposit from about 1–10 grams of the active ingredient on each 100 square feet of surface. However, larger or smaller amounts can be applied, as desired, although it is generally neither economical to employ larger amounts nor efficient, because of short insecticidal action, to employ smaller amounts. One excellent method for applying these insecticides is in the form of aqueous spray solutions. A typical aqueous spray solution or formulation comprises about 0.5 weight percent of one of the insecticides of this invention, a small amount of an emulsifier such as an alkylated aryl polyether alcohol (Triton X–100) and the remainder water. The higher boiling materials, that is, materials having tert-alkyl groups with eight or more carbon atoms, are oil type materials and are advantageously dispersed in a carrier medium such as water with an emulsifying agent.

In using the active insecticidal materials of the present invention, they may be applied in undiluted form, as concentrate, or in high dilution. There may be applied in undiluted form or as concentrates with the assistance of fog or similar apparatus to trees and other plants, as well as to other bases frequented by insects. Because of their effectiveness and to lessen cost and to facilitate distribution of the small amount of material necessary to obtain the desired insecticidal results, they are, as a practical matter, usually applied in admixture with a carrier, preferably, water. When used with adjuvant carriers, either as concentrates or at high dilution, as indicated above, the insecticidal ingredients of the present invention may be applied with or without a wetting agent. Further, liquid carriers may be water, mineral oils, organic solvents, or other solvents or suspending agents. For general use on plants, for example, to combat grasshoppers, the insecticidal material is usually employed as a water emulsion. The concentrates or diluted compositions of the present invention may also contain other insecticidal, miticidal and fungicidal agents if desired. Further, insecticidal materials of the present invention can be advantageously utilized as dormant oil sprays, and as base oils for both insecticides and fungicides.

As noted above, the extender is preferably water. Substantially any emulsifier may be used to hold the ethane dithio-tert-alkyl ethers of the present invention in suspension, although an alkylated aryl polyether alcohol (Triton X–100) and a sodium salt of an alkylaryl polyether sulfate (Triton X–301) are particularly effective. The insecticide concentrate preferably contains from about 3 to about 15 percent by weight of surfactants based on the total weight of the concentrate. The concentrate can be prepared with a proper proportion of ethane dithio-tert-alkyl ether and sufficient emulsifying agent, as previously stated, to yield the sprays as emulsions upon stirring with water.

The insecticides of this invention are compatible and can be used together with other insecticides such as DDT, chlordane, etc. Also, they can be used with synergists such as N-alkyl imides of bicyclo[2.2.1]-5-heptene-2,3-dicarboxylic acid and sesoxane [2-(2-ethoxyethoxy)ethyl-3,4-methylenedioxyphenyl acetal of acetaldehyde] and knock-down agents such as pyrethrum, allethrin and the like.

The usefulness of the compositions of the present invention, the general method of application, and a method of their preparation will be illustrated in the following examples.

EXAMPLE I

A five pound sample of 1,2-di(tert-octyl mercapto) ethane was prepared in the laboratory by the following method:

Eight hundred (800) grams of sodium hydroxide were dissolved in 1,500 cc. methyl alcohol. Heating and stirring were employed, using a 2-gallon laboratory reactor. Reaction time was one hour at 170° F. and under slight pressure.

The above mixture was cooled and 2,920 grams of tert-octyl mercaptan added. Heat was applied and the temperature range was from 150° F. to 340° F. for 3.5 hours. The pressure ranged from 0–125 p.s.i.g. The sodium tert-octyl mercaptide has a slight pink-brown color and will solidify at room temperatures.

At 120° F., 990 grams of ethylene dichloride were added to the sodium tert-octyl mercaptide. The reaction took off exothermically and was controlled at 310° F. The pressure maximum rise was 155 p.s.i.g. Reaction was stopped after four hours. The product was removed as a pale yellow, viscous oil phase atop a sodium chloride and water-alcohol solution. There were large amounts of solid sodium chloride. Water washing of the product was necessary.

The product was purified by steam distillation to remove excess tert-octyl mercaptan (unreacted). The process was stopped when the mercaptan value of the distillate was less than 0.30 weight percent. At this stage, entrained water in the product gave it a cloudy appearance. This water was removed by heating the product to 200° F. and passing a stream of air through it at a reduced pressure. The final product is a pale yellow, viscous liquid, with no cloudiness.

The reactions for the above steps are as follows:

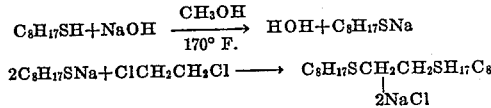

Balance data and properties of the product are listed in Tables I and II.

Table I

[Balance data for synthesis of 1,2-di(tert-alkyl mercapto) ethane]

| | Grams | Mols |
|---|---|---|
| A. Charge: | | |
| Tert-octyl mercaptan | 2,920.0 | 20.0 |
| Methanol | 1,187.0 | 37.1 |
| Sodium Hydroxide | 800.0 | 20.0 |
| Ethylene Dichloride | 990.0 | 10.0 |
| B. Product | 2,535.0 | 7.95 |
| C. Yield, mol percent | 79.5 | |

Table II

[Properties of 1,2-di(tert-octyl mercapto) ethane product]

| | Found | Theoretical |
|---|---|---|
| A. Property: | | |
| Mercaptan sulfur, wt. percent | 0.3 | |
| Total sulfur, wt. percent | 20.5 | 20.42 |
| Mol weight | 297.0 | 318.00 |
| Refractive Index 20/D | 1.4990 | |
| Specific Gravity 20/4 | 0.9221 | |
| Color | Pale Yellow | |
| Viscosity, 100° F | 1,600.0 Centistokes | |

B. Distillation of product, ° F. at 5 mm. mercury:
IBP ———————————————— 236.
5 ————————————————— 258.
10 ———————————————— 286.
20 ———————————————— 334.
30 ———————————————— 351.
40 ———————————————— 355.
50 ———————————————— 357.
60 ———————————————— 358.
70 ———————————————— 360.
80 ———————————————— 362.
90 ———————————————— 372.
94.5 ———————————————— 410 (Started Cracking).

EXAMPLE II

Tests were carried out utilizing several of the compounds of the present invention to determine their effectiveness in killing grasshoppers and roaches. Insecticidal compositions comprising 0.5 weight percent of the steam distillation 1,2-di(tert-octyl mercapto) ethane product of Example I emulsified in water and 0.5 weight percent of a steam distillation 1,2-di(tert-dodecyl mercapto) ethane product obtained in a process similar to Example I emulsified in water were used in these tests. The results of these tests are presented in Table III.

Procedures used in these tests were as follows: cardboard quart containers with one side cut away and covered with screen wire were used in the grasshopper tests. Ten grasshoppers were placed into each container. Grass and a small tree branch were added to each container to provide food and perching space for the grasshoppers. Fresh grass was added each day during the test.

Large beakers (1,000 cc.) were used in the cockroach tests. A thin layer of vasoline was applied near the top of the beaker to prevent the roaches from escaping. Ten cockroaches were placed into each beaker. A small portion of cat food was also placed in each beaker as food for the roaches. The compounds to be tested were applied as emulsions in water, sprayed directly into the container wetting the insects and container walls as well as the grass and cat food. One container of insects was left unsprayed as a control for each run. Observed mortality rates were recorded after one day, two days and three days.

Table III

| | Percent Kill | |
|---|---|---|
| | 2 days | 3 days |
| Grasshoppers: | | |
| 1,2-di(tert-dodecyl mercapto) ethane | 80 | |
| 1,2-di(tert-octyl mercapto) ethane | 90 | 100 |
| Control | 15 | 30 |
| Roaches: | | |
| 1,2-di(tert-dodecyl mercapto) ethane | 50 | 50 |
| 1,2-di(tert-octyl mercapto) ethane | 80 | |
| Control | nil | |

The effectiveness of the materials of the instant invention is clearly shown by the above tabulation.

Although the invention has been described primarily in connection with a pure 1,2-di(tert-alkyl mercapto) ethane compound as the insecticidal ingredient, it should be realized that mixtures comprising 1,2-di(tert-alkyl mercapto) ethane compounds such as a reaction product as described in Example I can also be utilized in the practice of the present invention as in Example II.

Reasonable variation and modification are possible within the scope of the foregoing disclosure and the appended claims to the invention, the essence of which is that certain 1,2-di(tert-alkyl mercapto) ethane compounds, as defined, have been found to be insecticidal in character.

We claim:
1. A method of killing an insect which comprises subjecting said insect to the action of an insecticidal amount of a 1,2-di(tert-alkyl mercapto) ethane compound having the structural formula

$$R\text{—}S\text{—}CH_2\text{—}CH_2\text{—}S\text{—}R$$

wherein R is a tert-alkyl group having from 4 to 12 carbon atoms.

2. A method according to claim 1 wherein said compound is 1,2-di(tert-octyl mercapto) ethane.
3. A method according to claim 1 wherein said compound is 1,2-di(tert-dodecyl mercapto) ethane.
4. A method of combatting chewing insects which comprises applying to the insect host an insecticidal amount of a 1,2-di(tert-alkyl mercapto) ethane compound having the structural formula $$R\text{—}S\text{—}CH_2\text{—}CH_2\text{—}S\text{—}R$$

wherein R is a tert-alkyl group having from 4 to 12 carbon atoms.

5. A method according to claim 4 wherein said compound is 1,2-di(tert-dodecyl mercapto) ethane.
6. A method according to claim 4 wherein said compound is 1,2-di(tert-octyl mercapto) ethane.
7. A method of protecting a base against attack by insects which comprises placing between said base and said insect a film of a dispersion comprising, as a principal effective ingredient thereof, a 1,2-di(tert-alkyl mercapto) ethane compound having the structural formula $$R\text{—}S\text{—}CH_2\text{—}CH_2\text{—}S\text{—}R$$

wherein R is a tert-alkyl group having from 4 to 12 carbon atoms in a carrier medium.

8. A method according to claim 7 wherein said active ingredient is 1,2-di(tert-octyl mercapto) ethane.
9. A method of protecting a plant against attack by grasshoppers which comprises spraying said plant with an insecticidal amount of an aqueous spray mixture containing as a principal active ingredient thereof a 1,2--di(tert-alkyl mercapto) ethane compound having the structural formula $$R\text{—}S\text{—}CH_2\text{—}CH_2\text{—}S\text{—}R$$

wherein R is a tert-alkyl group having from 4 to 12 carbon atoms, a minor amount of an emulsifying agent and water.

10. A method according to claim 9 wherein said compound is 1,2-di(tert-octyl mercapto) ethane.
11. A method according to claim 9 wherein said compound is 1,2-di(tert-dodecyl mercapto) ethane.
12. An insecticidal composition comprising, as a toxicant, a 1,2-di(tert-alkyl mercapto) ethane compound having the structural formula $$R\text{—}S\text{—}CH_2\text{—}CH_2\text{—}S\text{—}R$$

wherein R is a tert-alkyl group having from 4 to 12 carbon atoms, an emulsifying agent and water.

13. A composition according to claim 12 wherein said toxicant is 1,2-di(tert-octyl mercapto) ethane.
14. A composition according to claim 12 wherein said toxicant is 1,2-di(tert-dodecyl mercapto) ethane.

References Cited in the file of this patent

UNITED STATES PATENTS

| | | |
|---|---|---|
| 2,568,035 | Stewart | Sept. 18, 1951 |
| 2,882,197 | Webb | Apr. 14, 1959 |